Dec. 13, 1955
V. O. ABRAMSON
2,726,727
BRACING MEANS FOR THE UPPER PORTIONS
OF AUTOMOBILE PROTECTIVE SCREENS
Filed June 6, 1955
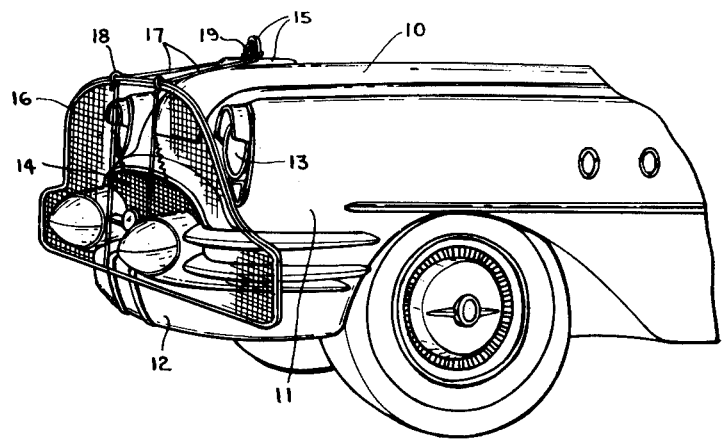
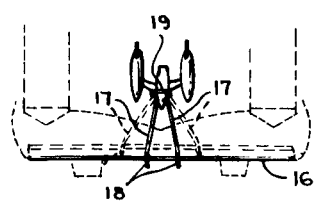
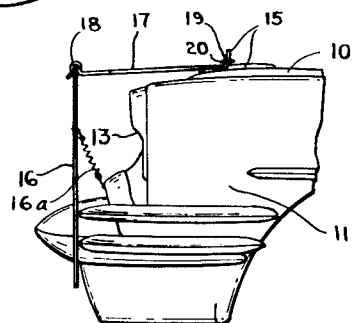
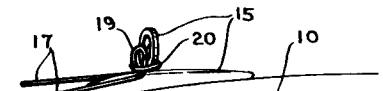
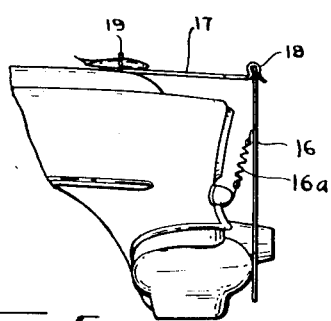
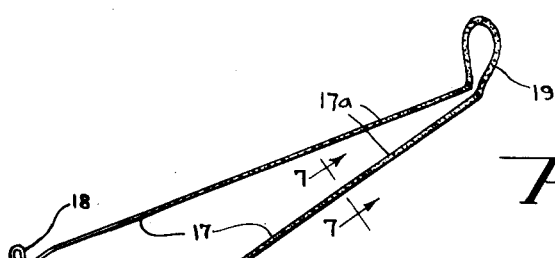
INVENTOR.
VINCENT O. ABRAMSON
BY
Williamson, Schroeder, Adams & Meyers
ATTORNEY

:::::::::::::::::::::::::::::::::::::::::::::::::::::::::::::::::::::

United States Patent Office 2,726,727
Patented Dec. 13, 1955

2,726,727

BRACING MEANS FOR THE UPPER PORTIONS OF AUTOMOBILE PROTECTIVE SCREENS

Vincent O. Abramson, Minneapolis, Minn., assignor to Parker Products, Inc., Minneapolis, Minn., a corporation of Minnesota Application June 6, 1955, Serial No. 513,185

4 Claims. (Cl. 180—68)

This invention relates to bracing means for holding the upper portions of automobile protective screens in outwardly spaced relation from the front of the automobile.

During recent years automobile protective screens generally known as "bug screens," have become extremely popular to protect the grill and front hood and fender portions of an automobile. These screens not only prevent bugs from striking the automobile but also protect the same against impact from stones and other hard objects which are thrown up from a leading automobile. When these automobiles are travelling at high rates of speed the wind resistance of the protective screen forces the same back into contact with the front portion of the automobile and causes rubbing and wear of the screen itself against the paint of the automobile hood and seriously damages the finish on said hood.

It is an object of my present invention to provide a bracing strut interposed between the upper portion of the screen and the front portion of the automobile disposed immediately therebehind.

More specifically it is an object to provide a bracing strut attachable at its forward end to the upper portion of a protective screen and engageable at its rear end with the hood ornament to maintain a predetermined spaced relation between the screen and the front portion of the automobile.

Still more specifically it is an object to provide a bracing strut having a pair of hook elements at the front end thereof for attachment to the upper marginal edge of a protective screen and having a hood ornament abutment member at the rear thereof for engagement against the hood ornament of the automobile.

These and other objects and advantages of my invention will more fully appear from the following description made in connection with the accompanying drawings wherein like reference characters refer to the same or similar parts throughout the several views, and in which:

Fig. 1 is a perspective view of my bracing member in operative position on the front of a typical automobile;

Fig. 2 is a side elevational view of the structure shown in Fig. 1;

Fig. 3 is an enlarged perspective view of the rear portion of the bracing strut shown in Figs. 1 and 2;

Fig. 4 is a top plan view of my bracing strut as applied to a different form of hood ornament;

Fig. 5 is a side elevational view of the structure shown in Fig. 4; and

Fig. 6 is a perspective view of my bracing strut, per se and

Fig. 7 is a cross sectional view of the bracing strut on line 7—7 of Fig. 6.

As illustrated in the accompanying drawing, I show the forward portion of a typical automobile having a hood 10, fenders 11, front bumper 12, headlights 13, grill 14 and hood ornament 15.

A protective screen designated as an entirety by the numeral 16 has its lower portion suitably attached to the bumper and grill portion of the automobile in the conventional manner such as by the spring attachment elements 16a illustrated and disclosed in United States Letters Patent No. 2,501,065 to L. Longeway. The protective screen 16 is of a sufficient size to fully cover the upper portion of the bumper 12, the grill 14 and the front portion of the hood 10 and the top of said screen is disposed at substantially the same elevation as the top of the hood 10.

As best shown in Fig. 6, I provide a bracing strut structure which in the form shown is formed from a single elongated piece of heavy wire doubled back upon itself to form a loop end with a pair of generally diverging strut arms 17 extending forwardly therefrom. The forward ends of these strut arms have suitable attachment means such as the slightly resiliently yieldable hook or clip elements 18 formed thereof and the loop portion of said arms is bent upwardly at right angles into an upstanding abutment 19 disposed at substantially right angles to the plane defined by said arms 17. As best shown in Fig. 7 the rear portion of the arms including the entire abutment element 19 has a suitable padding 17a coated thereon such as a resilient plastic or rubber base material to prevent marring or scratching of engaged portions of the hood ornament. The loop formed by upstanding abutment member 19 is adapted to receive forwardly protruding hood ornaments such as the type illustrated in Figs. 1, 2 and 3, however, it is advisable to provide an additional anchoring means such as the resilient spring loop member 20, best shown in Fig. 3. Obviously the lower portion of the abutment loop 19 adjacent the rear extremities of the strut arms 17 is smaller than the intermediate portion of said loop and thus the endless resilient anchoring member 20 is maintained in positive attachment therearound and securely holds the same to the embraced ornament which in the form shown is of generally similar circular shape to the loop 19.

The clips 18 are adapted to be received over the upper edge of the screen as best shown in the drawing and the spacing between the two clips, of course, determines the distance maintained between the engaged ornament and the screen. The farther said hooks are spaced apart the closer the screen will be held with respect to the front of the automobile and with respect to the engaged ornament, as best shown by the full and dotted line positions in Fig. 4. The conventional method of manufacturing screens includes a reinforced wire frame or bead extending around the entire perimeter thereof thus providing a relatively rigid attachment portion for the two clip elements 18. The clip means 18 are slightly resiliently yieldable as has been previously stated in order to permit removal thereof from the reinforcing wire bead along the upper edge of the screen whereby the hood 10 may be opened for servicing the automobile engine without removal of the screen therefrom. In the event that the abutment element 19 is not positively connected with the hood ornament 15 as when used with the form of the hood ornament shown in Figs. 4 and 5, these resilient clip elements 18 may be merely left attached to the screen and the screen pulled forward a sufficient distance to permit the hood to clear the screen and entire bracing strut structure. Obviously it is also possible, even thought the abutment element 19 is not positively attached to the hood ornament, to leave he bracing structure in place when the hood is raised and remove the two clips 18 from the screen as previously described.

When the hood ornament has a forwardly projecting spear-like member such as is illustrated in Figs. 4 and 5, the padded loop 19 is designed to receive said spear-like member therethrough and tightly wedge the same therein, thus obviating the necessity of the anchoring loop 20 to hold the upstanding abutment element 19 positively against the hood ornament 15.

It will be seen that I have provided a relatively simple yet highly efficient bracing strut specifically constructed to be interposed between the upper portion of an automobile protective screen and the hood ornament of an automobile. Obviously different manufacturers have different shaped hood ornaments, however, the padded loop construction 19 with the padded rear arm portions is adapted to provide a substantially universal mounting with respect to said hood ornament and thus provide the necessary abutment support for said arms 17.

It will, of course, be understood that various changes may be made in the form, details, arrangement and proportions of the parts without departing from the scope of my invention which generally stated consists in the matter set forth in the appended claims.

What is claimed is:

1. In combination with a motor vehicle having a vertically opening hood, a light-weight flexible protective screen fixedly secured only in its lower region to the front of the vehicle, said screen being disposed in generally upstanding protective relation across the hood and grill of the vehicle and with a substantial upper portion thereof flexible and spaced forwardly of the hood, a strut member interposed between the upper portion of the screen and the hood to maintain a predetermined spaced relation between said upper screen portion and said hood and a portion of the strut being normally in a position such as to interfere with opening of the hood, there being first and second means at opposite ends of the strut engaged with the hood and screen respectively to prevent rearward displacement of the screen and maintain the spaced relation between the upper portion of the screen and the hood, one of said means being disengageable from its associated member by pulling the strut away from such member, whereby the hood will be free to swing open, and the other means being so attached to its associated member that the strut is substantially rigidly carried thereby after the strut is disengaged at its other end and positions said one means so as to be readily reengaged with its associated member when the hood is again closed.

2. The combination according to claim 1, wherein said strut comprises a pair of divergent arms joined at one end, said arms being deformable to alter their divergency for adjusting the spaced relation between the upper portion of the screen and the hood.

3. The combination according to claim 1, wherein said one means comprises a loop formed on the end of the strut and disposed substantially at right angles thereto, said loop being engaged around a forwardly projecting portion of a hood ornament.

4. In combination with a motor vehicle having a vertically opening hood, a lightweight, flexible, protective screen secured in its lower region to the front of the vehicle, said screen being disposed vertically in protective relation to substantially the entire area of the front of the vehicle defined by the hood, grill and fenders and in spaced relation thereto, and a strut member extending between the upper portion of the screen and the hood, there being first and second means on opposite ends of the strut for attachment to the screen and hood respectively, the first means constituting a hook-like formation on the strut which is disposed in a vertical plane and which opens downwardly to engage over the upper edge of the screen to prevent rearward bending of the screen while at the same time being readily disengaged therefrom by movement of the strut vertically.

References Cited in the file of this patent

UNITED STATES PATENTS

| | | |
|---|---|---|
| 1,388,908 | Wilson | Aug. 30, 1921 |
| 1,867,509 | Kalenoff | July 12, 1932 |
| 1,940,984 | Warner | Dec. 26, 1933 |
| 2,034,493 | Sonnenberg | Mar. 17, 1936 |
| 2,078,866 | Metz | Apr. 27, 1937 |
| 2,254,137 | Biehn | Aug. 26, 1941 |
| 2,501,065 | Longeway | Mar. 21, 1950 |
| 2,511,451 | Abbe | June 13, 1950 |
| 2,583,759 | Williams et al. | Jan. 29, 1952 |